United States Patent [19]
Booras

[11] Patent Number: 5,647,600
[45] Date of Patent: Jul. 15, 1997

[54] CART

[75] Inventor: Peter T. Booras, Julian, N.C.

[73] Assignee: American Wholesale Beverage Co., Inc., Greensboro, N.C.

[21] Appl. No.: 370,404

[22] Filed: Jan. 9, 1995

[51] Int. Cl.⁶ .................................................. B62B 11/00
[52] U.S. Cl. .......................... 280/47.35; 280/79.3; 211/42
[58] Field of Search .......................... 280/47.34, 47.35, 280/47.371, 79.11, 79.2, 79.3; 211/74, 42, 43; 248/346.1

[56] References Cited

U.S. PATENT DOCUMENTS

| | | | |
|---|---|---|---|
| D. 142,497 | 10/1945 | Rider | 280/79.3 |
| 3,149,726 | 9/1964 | Magers | 280/79.3 |
| 4,067,265 | 1/1978 | Watson | 280/79.3 |
| 4,391,454 | 7/1983 | Marsh et al. | 280/47.35 |
| 5,505,473 | 4/1996 | Radcliffe | 280/79.3 |

FOREIGN PATENT DOCUMENTS 940281  10/1963  United Kingdom ................ 280/79.3

*Primary Examiner*—Richard M. Camby

[57] ABSTRACT

A cart for transporting case goods such as wine or beverage bottles is provided which is easy and convenient to use. Goods in open cases can be positioned on the cart at a bias along lateral shelves which allows an inventory control clerk to quickly scan the bar codes of the items without removal of the cases from the cart as they enter the store. The cart also includes a stabilizing mechanism to prevent movement as the cart is loaded or unloaded from a truck on a lift gate.

3 Claims, 2 Drawing Sheets

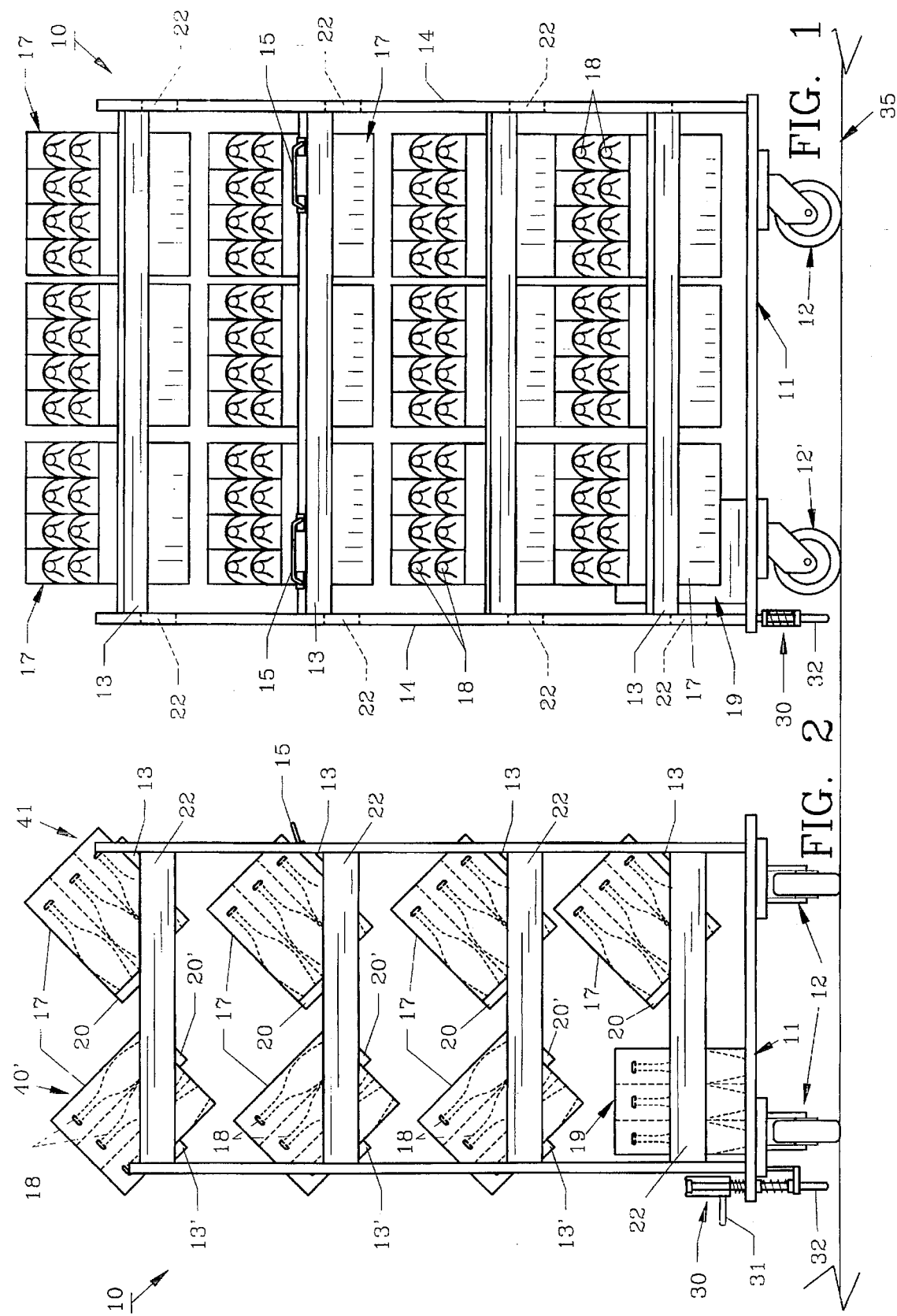

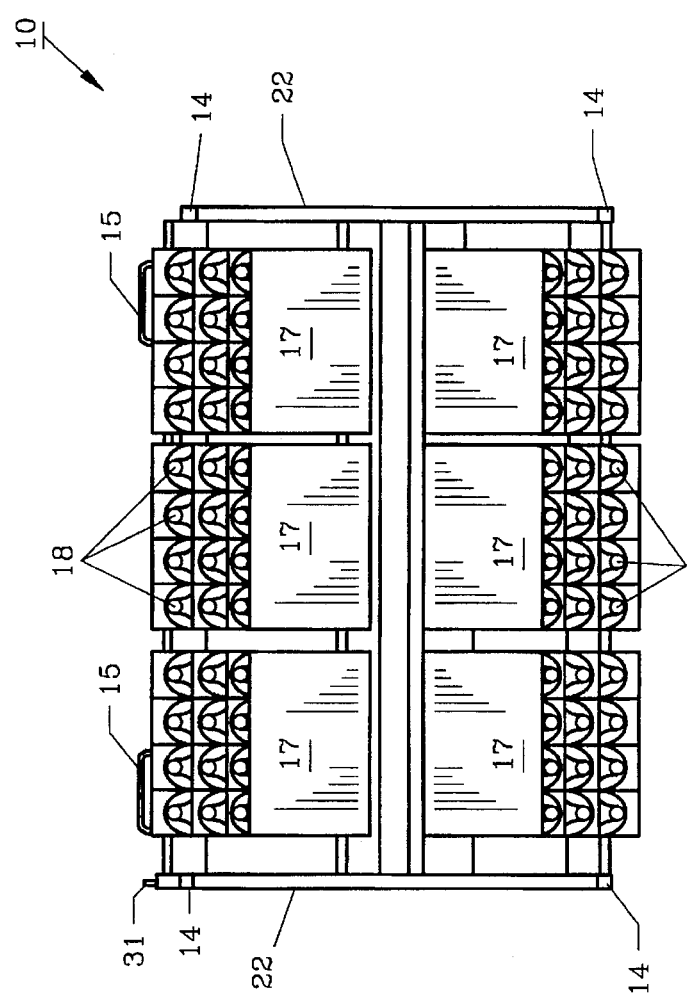
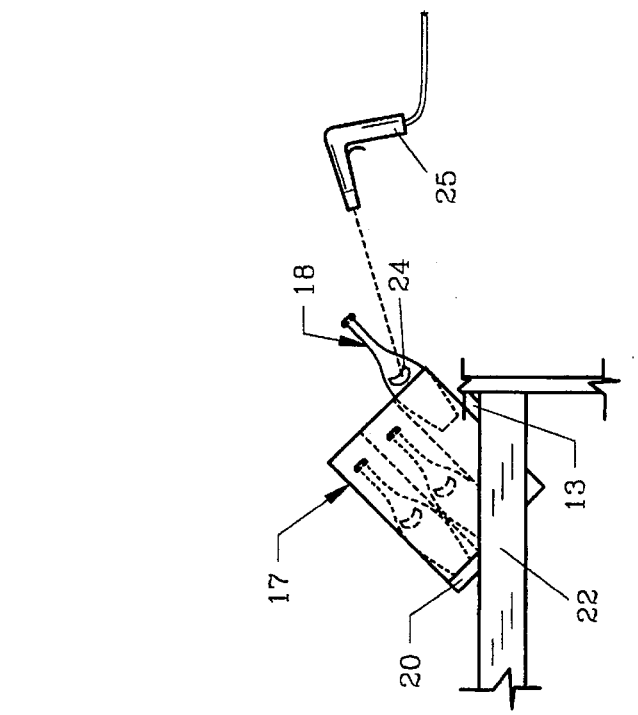
FIG. 3
FIG. 4

CART

BACKGROUND OF THE INVENTION

1. Field of the Invention

The invention herein pertains to wheeled carts and methods as are used to transport case and other goods to and from trucks for delivery into retail establishments such as grocery stores, drugstores, or the like.

2. Description of the Prior Art and Objectives of the Invention

Hand trucks, fork lifts and various types of manually powered, four-wheel carts have been used for many years by delivery and inventory personnel to transport incoming goods to and from delivery trucks into retail establishments. In recent years it has been common practice to optically scan bar coded merchandise which is incoming to properly direct and control store inventory. Manual carts which have been used to date oftentimes have to be unloaded for optical scanning or inventory purposes since stacked case goods cannot be conveniently opened, or if opened, cannot be adequately seen by inventory controllers when the goods remain on conventional carts. As most case goods on carts are stacked vertically, loading and unloading from such carts has also been a problem when dealing with vertically elongated merchandise such as wine bottles and other beverage containers.

Therefore, as a result of the problems and disadvantages of prior art carts and methods of use, the present invention was conceived and one of its objectives is to provide a cart for case goods which can be loaded for easy visability and manually rolled from one location to another.

It is another objective of the present invention to provide a cart and method for use with case goods whereupon the goods can be readily handled, checked, scanned, or inspected as needed without substantial movement or removal from the cart.

It is also another objective of the present invention to provide a cart which includes a stabilizing mechanism to maintain the cart securely on a truck gate lift during loading or unloading from the truck.

It is still another objective of the present invention to provide a cart which includes a plurality of lateral shelves for maintaining case goods thereon in a biased position.

Various other objectives and advantages of the present invention will become apparent to those skilled in the art as a more detailed description is set forth below.

SUMMARY OF THE INVENTION

A cart and method are presented for case goods for quickly and conveniently loading, transporting, scanning, and stocking grocery shelves or the like. Such carts can be, for example, loaded at a distribution center with various case goods and rolled into a delivery truck. A stabilizing mechanism allows the carts, when fully loaded, to remain in a stable, fixed position while being placed on a truck with a gate lift. Upon arrival at the retail store, the stabilizing mechanism is engaged as the cart is unloaded while on the hydraulic gate lift. The stabilizing mechanism can then be disengaged to allow the cart to be rolled from the gate lift into the store interior for optical scanning or other inventory control procedures. The case goods are maintained in a bias position on the cart to allow inventory personnel to easily view a bar code or other identifying labels on the contained items without the necessity of removing the items from the case. Thereafter, the cart can be guided to a store shelf destination and the shelf stocked from the cart. The cart is then rolled back to the truck for return to the distribution center. The cart and its method of use provide savings in time, effort, and money and afford much covenience to the user.

BRIEF DESCRIPTION OF THE DRAWINGS

FIG. 1 demonstrates a front view of a cart loaded with cases containing wine bottles;

FIG. 2 demonstrates an end view of the cart as shown in FIG. 1;

FIG. 3 is a top plan view of the cart seen in FIG. 1; and

FIG. 4 provides a schematic representation of a method of scanning a bar coded label on a wine bottle.

DESCRIPTION OF THE PREFERRED EMBODIMENT AND OPERATION OF THE INVENTION

For a better understanding of the invention and its method of operation, turning now to the drawings, FIG. 1 illustrates preferred metal cart 10 formed from steel or aluminum which has been loaded with a plurality of cases 17, which may consist of cardboard cartons, each containing wine bottles 18. As depicted, cases 17 are positioned at an approximate 45 degree angle relative to the ordinary or vertical upright position for purposes as will be hereinafter further explained. As additionally shown in FIG. 1, cart 10 includes a pair of handles 15 for manually pulling and guiding cart 10 which is movable on casters 12 seen joined to planar base 11. Planar base 11 is rectangular in shape and is connected to upright tubular members 14 at each corner. Shelves 13, 13' as shown in FIG. 1 are attached to horizontal end braces 22 and comprise substantially planar lateral members upon which the sides of cases 17 rest. In addition to the angularly disposed cases 17 as seen in FIG. 1, the vertically positioned case 19 is also shown conventionally resting in a normal, upright manner on base 11, seen in more detail in FIG. 2, as provided for special items or purposes.

As shown in FIG. 2, a plurality of shelves 13' and 20' are arranged in column 40', while a plurality of shelves 13 and 20 are arranged in column 40. Column 40' is vertically staggered relative to column 40, and column 40' is spaced horizontally from column 40.

In FIG. 2 an end view of cart 10 is shown illustrating the angular positioning of cases 17. As seen herein, only wine cases are shown; however, various other types of case goods such as grocery products and food may be likewise transported. In addition to shelves 13, 13' as shown in FIG. 1, cases 17 rest upon centrally located shelves 20, 20' which are positioned at an approximate 90 degree angle to shelves 13 and 13' respectively. Shelves 20, 20' as seen in FIG. 2 provide support to the bottoms of cases 17, whereas shelves 13, 13' support the sides of cases 17.

For normal delivery procedures of various case goods, a delivery truck with or without carts is loaded with goods and driven to the store destination. Once there, the delivery person or store employee places, as necessary, the case goods on hand trucks, carts, conveyors, or the like where the goods are then moved into the store interior. The goods are entered into the inventory system of the store (which usually requires removing the goods from the cart or conveyor), and the goods are then repositioned on a cart and are delivered to their designated display or storage area. Cart 10 allows the delivery person, inventory clerk, or the like to handle the case goods less, thus saving time and energy. As shown in FIG. 4, case 17 which has its top removed, will allow a single bottle of wine 18 to be partially extracted from case 17 as necessary and hand-held scanner 25 to record bar code label 24. The inventory clerk can then simply multiply the bar code by the number of bottles contained within case 17 for inventory control. Other goods may not even require partial removal from their cases since the tops or lids of certain containers carry a more visible bar code label. In either event, the angular positioning of the case goods allows for quick and easy inspection, counting, and scanning by hand-held optical scanner 25.

In FIG. 3 a top view of loaded cart 10 is shown to further illustrate the angular disposition of cases 17. As would be understood, bottles 18 contained therein are easily, partially removed if necessary for scanning and inventory purposes.

The method of using cart 10 and the handling of case goods is readily apparent and can be carried out by placing case goods on bias shelves 13, 13', 20, 20' of cart 10 as shown in FIGS. 1,2, and 3. Cases 17 can be opened by removing the top with a razor knife to therefore expose goods 18 therein before placing cases 17 on cart 10. Thereafter, cart 10 is manually rolled on casters 12, 12' to an inventory control station, shelf, or the like and goods, such as wine bottles 18, are removed therefrom either individually or by the case and stacked for storage and/or selection by shoppers.

In order to prevent cart 10 from inadvertent movement during loading or unloading from a delivery truck having a hydraulic lift gate, stabilizing mechanism 30 is provided as shown in FIG. 1 and affixed to cart 10 proximate base 11. Mechanism 30 includes foot lever 31 which is connected to stabilizing pin 32 to engage an opening in the hydraulic lift gate (not shown), thereby preventing cart motion as the cart is lifted or lowered by the lift gate. Stabilizing mechanism 30 has a pair of coiled springs surrounding pin 32 to provide both upward and downward tension. Pin 32 is threaded to allow rotation for providing downward motion to engage pin 32 in the lift gate opening as described above. To disengage pin 32, foot lever 31 is counter rotated, thus allowing pin 32 to disengage from the lift gate opening and be urged upwardly by spring action, whereupon cart 10 can be rolled from the lift gate.

Casters 12 as seen in FIG. 2 are fixed, whereas casters 12' on the opposite end of cart 10 swivel and releasably lock in a straight direction for ease and control as the cart is rolled from one location to another.

The illustrations, material and examples provided herein are for explanatory purposes and are not intended to limit the scope of the appended claims, it being understood that those skilled in the art may substitute other construction materials as required to form carts 10 or components thereof.

I claim:

1. A cart for handling case goods comprising: a rectangular base, a plurality of casters, said casters attached to said base, a first column of shelves, a second column of shelves, said first column of shelves staggered vertically relative to said second column of shelves, said first column of shelves spaced horizontally from said second column of shelves, each of said shelves affixed to said base at a bias whereby case goods placed on said shelves are maintained at a bias to said base.

2. The cart of claim 1 wherein each of said shelves comprise a lateral member.

3. The cart of claim 1 and including a plurality of upright members, said upright members attached at the corner of said base.

* * * * *